United States Patent
Rodriguez et al.

(10) Patent No.: US 12,088,225 B2
(45) Date of Patent: Sep. 10, 2024

(54) METHOD AND AN ARRANGEMENT FOR CONTROLLING VIBRATION OF A VARIABLE FREQUENCY DRIVE CONTROLLED ELECTRIC MACHINE

(71) Applicant: ABB Schweiz AG, Baden (CH)

(72) Inventors: Pedro Rodriguez, Västerås (SE); Rahul Kanchan, Västerås (SE); Omer Ikram Ul Haq, Surahammar (SE); Qimao Liu, Västerås (SE); Ingo Stroka, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/812,857

(22) Filed: Jul. 15, 2022

(65) Prior Publication Data

US 2023/0025973 A1  Jan. 26, 2023

(30) Foreign Application Priority Data

Jul. 15, 2021 (EP) .................................. 21185884

(51) Int. Cl.
*H02P 23/04* (2006.01)
*G05D 19/02* (2006.01)
*H02P 23/00* (2016.01)

(52) U.S. Cl.
CPC .......... *H02P 23/0004* (2013.01); *G05D 19/02* (2013.01)

(58) Field of Classification Search
CPC ...... H02P 23/04; H02P 23/0004; G05D 19/02
USPC ........................................................ 318/260
See application file for complete search history.

(56) References Cited

U.S. PATENT DOCUMENTS

| | | | | |
|---|---|---|---|---|
| 5,164,647 | A  * | 11/1992 | Moulds, III | G05D 19/02 318/561 |
| 2004/0085035 | A1 * | 5/2004 | Tazawa | H02P 6/06 318/432 |
| 2011/0084636 | A1 * | 4/2011 | Kyllingstad | H02P 6/06 318/400.23 |

(Continued)

OTHER PUBLICATIONS

Jover, Rodrguez, P., et al.; "Mechanical Model to Study Induction Motor under Fault Conditions"; Conference Proceeding CD, Paper No. 100., Chapter V, Hybrid model; Proceedings of the 16th International Conference on Electrical Machines (ICEM 2004); Cracow, Poland; Sep. 5, 2004.

(Continued)

*Primary Examiner* — Gabriel Agared
(74) *Attorney, Agent, or Firm* — Whitmyer IP Group LLC (57) ABSTRACT

A field of electric drive devices and electric machines, such as electric motors and electric generators for industrial applications and more particularly to a method and an arrangement for controlling vibration of a variable frequency drive controlled electric machine. In the method for controlling vibration of a variable frequency drive controlled electric machine, the resonance frequency/frequencies and the stiffness are determined in a ramp up/ramp down test; amount of damping is determined in an impulse test; a mechanical transfer function is determined in a steady drive test; a vibration control model is determined utilizing said resonance frequency/frequencies, said stiffness, the amount of damping and the mechanical transfer function; and vibration is controlled utilizing the vibration control model.

15 Claims, 9 Drawing Sheets

(56) References Cited

U.S. PATENT DOCUMENTS

| | | | |
|---|---|---|---|
| 2011/0288791 A1* | 11/2011 | Jeppesen | ................. G01N 3/38 |
| | | | 702/42 |
| 2014/0129030 A1* | 5/2014 | Zhuge | .................... G05D 19/02 |
| | | | 700/275 |
| 2015/0184324 A1 | 7/2015 | Mo | |
| 2018/0067086 A1* | 3/2018 | Tian | ................... G01N 29/4454 |
| 2020/0169212 A1* | 5/2020 | Huh | ........................ H02P 21/18 |
| 2021/0025940 A1* | 1/2021 | Xiang | ................. G01M 5/0066 |

OTHER PUBLICATIONS

Jover, Rodríguez, P., et al.; "Mechanical Model to Study Induction Motor under Fault Conditions"; Conference Proceeding CD, Paper No. 100, Chapter III, Analysis with simulation data; Proceedings of the 16th International Conference on Electrical Machines (ICEM 2004), Cracow, Poland; Sep. 5, 2004.

European Search Report; Application No. EP 21 18 5884; Completed: Jan. 13, 2022; 2 Pages.

* cited by examiner

METHOD AND AN ARRANGEMENT FOR CONTROLLING VIBRATION OF A VARIABLE FREQUENCY DRIVE CONTROLLED ELECTRIC MACHINE

TECHNICAL FIELD

The present invention relates to the field of electric drive devices and electric machines, such as electric motors and electric generators for industrial applications, and more particularly to a method and an arrangement for controlling vibration of a variable frequency drive controlled electric machine.

BACKGROUND

Electric drive arrangements are widely used for industrial applications, e.g. for providing and controlling electrical power and energy to various public and industrial applications as well as for driving and controlling various public and industrial applications. Electric drives are used in industry for different applications, such as for driving motors within the transportation industry, for driving different devices within the process and manufacturing industry as well as within the energy industry. There are applications commonly used for electric drives within the transportation industry for example in metro and railway traffic applications as well as in ship propulsion unit applications of the marine industry. Within the process and manufacturing industry, electric drives can be used for example in conveyer applications, in mixer applications or even in paper machine applications. Within the energy industry, electric drives can be used for example as electric drives for wind turbines of the wind power industry.

Electric drives for electric machines, such as for electric motors and electric generators, may be divided into AC drives (AC, alternating current) and DC drives (DC, direct current). AC drives are also commonly referred to as VFDs (VFD, Variable frequency Drive). Variable frequency drives control the speed of an electric machine by changing the voltage and frequency and are used with AC motors and generators.

In a DC motor of a DC drive, a magnetic field is generated by the current through the field winding in the stator. This magnetic field is always maintained at right angles to the field generated by the armature winding. In this way, a DC motor's torque is generated, which torque can then be easily controlled in a DC drive by changing the armature current and keeping the magnetizing current constant. In a DC drive, also the DC motor speed can be controlled directly through armature current.

Within electric drives, the AC drives may further be divided into frequency-controlled AC drives, flux-vector-controlled AC drives and into AC drives utilising direct torque control (DTC, Direct Torque Control). In flux-vector-controlled AC drives and in direct torque control AC drives the torque of the three-phase motor or generator can be controlled, whereas in frequency-controlled AC drives the load dictates the torque level.

Controlling the vibration of the electric machine by using VFD control has been a topic of interest in the last years. There are many studies done targeted to reducing the level of electric machine vibrations by using a VFD control device such as a frequency converter. Since even a good structural design cannot avoid resonance frequencies, which produce harmful vibrations when excited.

In electric machines, the foundations of the electric machine may vary significantly. Mechanical properties of the mechanical system such as natural frequencies, stiffness of different parts and damping factors determine the vibration behaviour of the system on site conditions. These natural modes as well as the properties of the mechanical system including the electric machine are closely related to potential excessive vibrations and electric machine faults.

Currently, a typical prior art method determining vibration characteristics of an electric machine is carried out with a kit of hard- and software, i.e. a modal analysis hammer kit. These modal analysis hammer kits are used for impulse testing of the dynamic behavior of mechanical structures by striking the object with the hammer and measuring the resulting response with the accelerometer. The hammer impacts a constant force over a broad frequency range, which depends on the type of tip used. The hammer typically has an integral, constant current quartz force sensor mounted on the striking end of the hammer head. The sensor converts the impact force into electrical signal for display and analysis.

Typically, in a prior art solution for determining vibration characteristics of an electric machine, the vibration excitation is given by a test hammer and the vibrations are measured by transducers. The data is analyzed by a spectrum analyzer. The obtained spectra must be post-processed to reach modal parameters, i.e. the natural modes and frequencies, and damping.

Within solutions for controlling the vibration of the electric machine, it is known that avoiding resonance frequencies is the main design principle related to electric machine vibrations. However, the resonance frequencies of the electric machine will be changed accordingly to the site conditions. Hence it is important to identify all resonance frequencies of the electric machine in site conditions. Moreover, in order to carry our vibration damping, it is necessary to know the different stiffness and damping of the electric machine mechanical system including the foundation. This is why it is needed a set of steps to be carried out by the VFD in order to determine all these parameters that will be filled in the control model and will allow the smart damping of the vibration and noise.

The foundation of the electric machines changes the natural modes and frequencies of the electric machine compared to the rigid foundation during the Factory Acceptance Test (FAT). The natural modes are closely related to the potential excessive vibrations on site conditions, and these vibrations are connected to the electric machine faults. If the natural modes are known in site conditions, the vibration behaviour can be predicted, and the potential risks identified. Identifying potential risks is beneficial in predictive condition monitoring and diagnostics.

Within prior art solutions for controlling the vibration of the electric machine, there are several problems in determining vibration characteristics of an electric machine. First significant drawback with prior art solutions in site conditions is that the modal testing requires a qualified person with a special equipment. Another major problem is that the modal testing is difficult to carry out in operational condition. This is why it is currently only used in serious trouble shooting cases. Currently, the on-line modal testing is mostly not used.

In today's demanding environment, there is a need for a more efficient and easier solution for method and an arrangement for controlling vibration of a variable frequency drive controlled electric machine. There is a demand in the market for a method and an arrangement for controlling vibration of a variable frequency drive controlled electric machine that would be more efficient and easier to carry out in operational condition than the current prior art solutions.

SUMMARY

The object of the invention is to introduce a method and an arrangement for controlling vibration of a variable frequency drive controlled electric machine, the condition of which can be more efficiently maintained. Advantageous embodiments are furthermore presented.

It is brought forward a new method for controlling vibration of a variable frequency drive controlled electric machine, in which method: the resonance frequency/frequencies and the stiffness are determined in a ramp up/ramp down test; amount of damping is determined in an impulse test; a mechanical transfer function is determined in a steady drive test; a vibration control model is determined utilizing said resonance frequency/frequencies, said stiffness, said amount of damping and said mechanical transfer function; and vibration is controlled utilizing said vibration control model.

In a preferred embodiment, in the step of determining the resonance frequency/frequencies and the stiffness: a ramp up/ramp down of the electric machine is executed; vibration is measured continually during said executed ramp up/ramp down as measured vibration data; a resonance frequency/resonance frequencies is/are determined utilizing said measured vibration data; and the stiffness is calculated utilizing said determined resonance frequency/frequencies.

In a preferred embodiment, said ramp up/ramp down is executed with the help of said variable frequency drive.

In a preferred embodiment, in the step of determining the amount of damping: an impulse is produced in an impulse test; vibration is measured continually during said impulse test as measured vibration data; and the amount of damping is calculated utilizing said measured vibration data.

In a preferred embodiment, in said impulse test, the electric machine is run by a given maximum voltage signal for a short time controlled by said variable frequency drive.

In a preferred embodiment, in the step of determining the mechanical transfer function: the electric machine is driven at a steady load in a steady state test; vibration is measured continually during said steady state test to thereby obtain measured vibration data; torque of the electric machine is recorded continually during said steady state test as recorded torque data; and a mechanical transfer function $H_{(S)}$ is calculated utilizing said measured vibration data and/or said recorded torque data.

In a preferred embodiment, in said steady state test, the electric machine is run at a certain load condition for a certain period controlled by said variable frequency drive.

In a preferred embodiment, in said steady state test, said mechanical transfer function $H_{(S)}$ is calculated in the frequency domain as:

$$H_{(S)} = \frac{A_{(s)}}{T_{(s)}},$$

where
$A_{(S)}$ is the discrete FFT of the acceleration in said measured vibration data, and
$T_{(S)}$ is the discrete FFT of the electromagnetic force in said said recorded torque data.

In a preferred embodiment, in the step of determining the vibration control model, a state space model of the physical system is built as a set of input variables, a set of output variables and a set of state variables related by equations.

Furthermore, it is brought forward a new arrangement for controlling vibration of a variable frequency drive controlled electric machine, said arrangement comprising a frequency converter, an electric machine and one or more vibration sensors, wherein said frequency converter is: arranged for executing a ramp up/ramp down of the electric machine in a ramp up/ramp down test and determining the resonance frequency/frequencies and the stiffness; arranged for running the electric machine by a given maximum voltage signal for a short time in an impulse test and determining amount of damping; arranged for running the electric machine at a certain load condition for a certain period in a steady drive test and determining a mechanical transfer function; arranged for determining a vibration control model utilizing said resonance frequency/frequencies, said stiffness, said amount of damping and said mechanical transfer function; and arranged for controlling vibration utilizing said vibration control model.

In a preferred embodiment, said electric machine motor is installed on a flexible bench.

In a preferred embodiment, said electric machine motor is installed on a non-flexible foundation.

In a preferred embodiment, said one or more vibration sensors comprise sensors, such as accelerometers, installed on the electric machine.

In a preferred embodiment, said sensors are installed close to the ends of the electric machine.

Furthermore, it is brought forward a new frequency converter of an arrangement for controlling vibration of a variable frequency drive controlled electric machine, said arrangement comprising a frequency converter, an electric machine and one or more vibration sensors, wherein said frequency converter is: arranged for executing a ramp up/ramp down of the electric machine in a ramp up/ramp down test and determining the resonance frequency/frequencies and the stiffness; arranged for running the electric machine by a given maximum voltage signal for a short time in an impulse test and determining amount of damping; arranged for running the electric machine at a certain load condition for a certain period in a steady drive test and determining a mechanical transfer function; arranged for determining a vibration control model utilizing said resonance frequency/frequencies, said stiffness, said amount of damping and said mechanical transfer function; and arranged for controlling vibration utilizing said vibration control model.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

In the following, the invention will be described in greater detail by means of preferred embodiments with reference to the accompanying drawings of FIGS. 1 to 9.

DETAILED DESCRIPTION

In the method for controlling vibration of a variable frequency drive controlled electric machine, the resonance frequency/frequencies and the stiffness are determined in a ramp up/ramp down test; amount of damping is determined in an impulse test; a mechanical transfer function is determined in a steady drive test; a vibration control model is determined utilizing said resonance frequency/frequencies, said stiffness, said amount of damping and said mechanical transfer function; and vibration is controlled utilizing said vibration control model.

Figure 1:
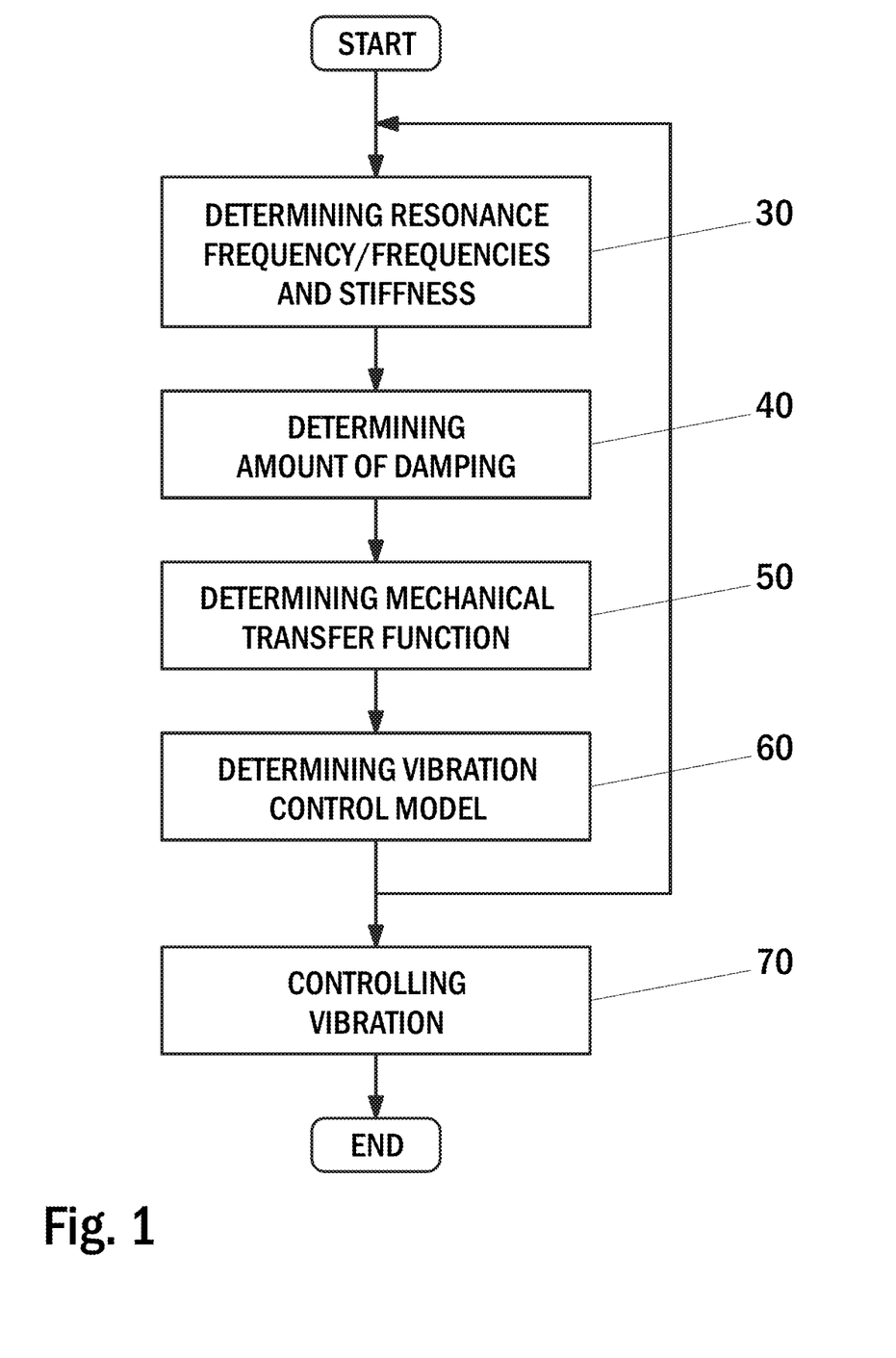
FIG. 1 illustrates a flow diagram of an embodiment of a method according to the present invention.

FIG. 1 illustrates a flow diagram of an embodiment of a method according to the present invention. In the method according to the present embodiment, the resonance frequency/frequencies and the stiffness of an electric machine are first determined 30. The determination 30 of the resonance frequency/frequencies and the stiffness is done in a ramp up/ramp down test carried out with the help of a variable frequency drive, e.g. a frequency converter.

Thereafter, in the method according to the present embodiment, the amount of damping is determined 40. The determination 40 of the amount of damping is done utilizing an impulse test carried out with the help of a variable frequency drive, e.g. a frequency converter.

Thereafter, in the method according to the present embodiment, a mechanical transfer function is determined 50. The determination 50 of the mechanical transfer function is done utilizing a steady drive test carried out with the help of a variable frequency drive, e.g. a frequency converter.

As the next step, a vibration control model is determined 60 utilizing said determined resonance frequency/frequencies, said stiffness, said amount of damping and said mechanical transfer function.

In the method according to the present embodiment, the steps of determining resonance frequency/frequencies and stiffness 30, determining amount of damping 40, determining mechanical transfer function 50 and determining vibration control model 60 may be repeated several times in a continuous loop, as deemed necessary.

In the method according to the present embodiment, an electric machine is driven by a variable frequency drive, The variable frequency drive measures and/or records speed data and torque data of the electric machine. After the vibration control model has been determined 60, vibration is controlled 70 utilizing said vibration control model.

Figure 2:
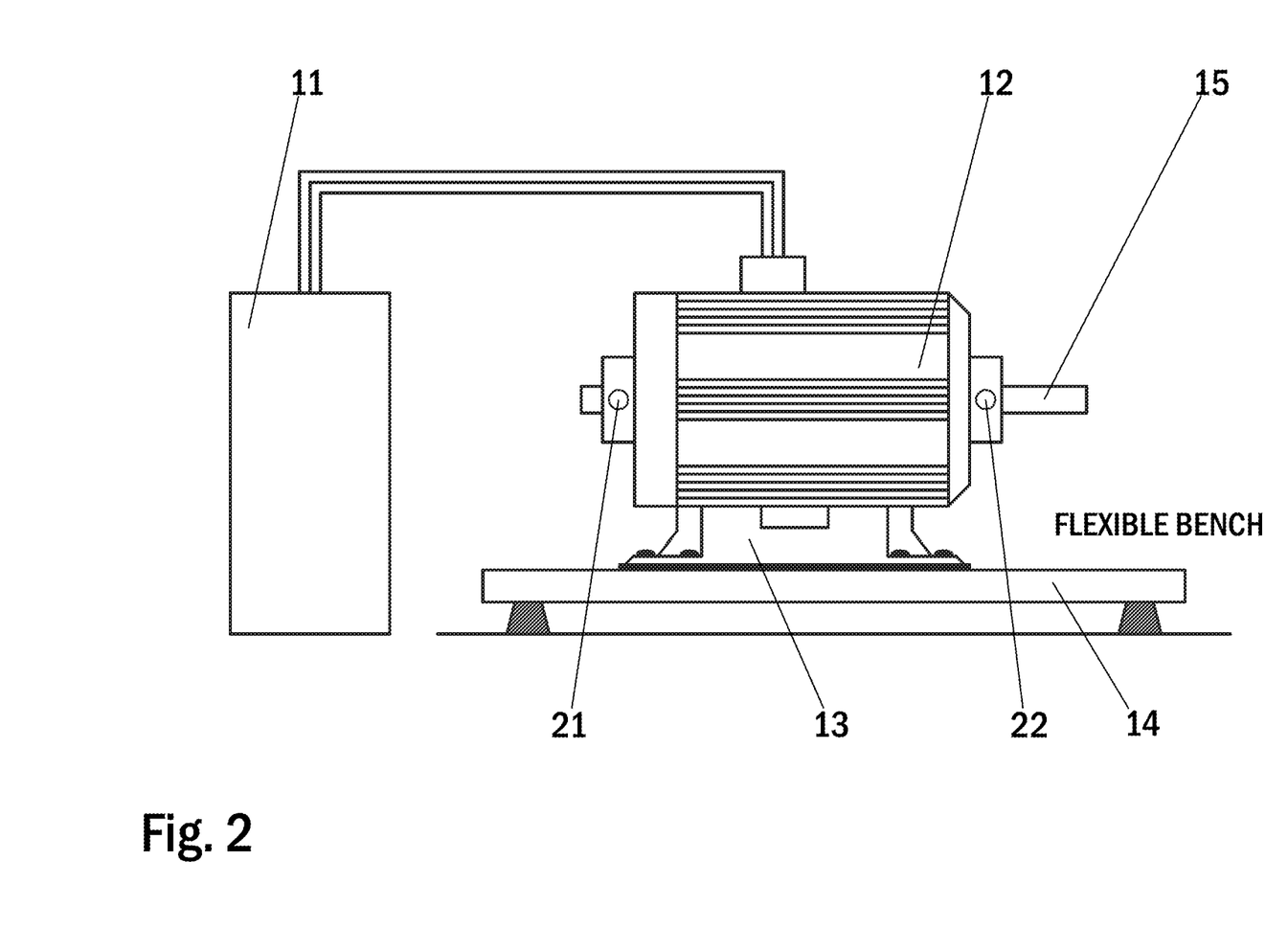
FIG. 2 illustrates a diagram of an embodiment of an arrangement according to the present invention.

FIG. 2 illustrates a diagram of an embodiment of an arrangement according to the present invention. The presented embodiment of an arrangement comprises a frequency converter 11 and an electric machine. In the presented embodiment, said electric machine is a motor 12, which motor 12 is installed on a foundation 14. In the presented embodiment, said foundation 14 is a flexible bench 14. Said motor 12 comprises a motor shaft 15 and motor legs 13 installed on said flexible bench 14.

In the presented embodiment, said arrangement comprises one or more vibration sensors 21, 22. Said one or more vibration sensors 21, 22 may comprise one or more vibration sensors attached to the bearing/bearings of said electric machine. Said one or more vibration sensors 21, 22 may comprise sensors 21, 22 installed on the motor 12, for example close to the ends of the motor 12, i.e. close to the motor bearings, e.g. in the bearing housing, in the end-shield or in the stator frame depending upon the investigated vibration mode. In the presented embodiment, said one or more vibration sensors 21, 22 are installed on the motor 12 close to the motor bearings, and are thus in a good position for investigating horizontal vibration mode.

In the presented embodiment of an arrangement according to the present invention, the frequency converter 11 is used for driving the motor 12 installed on a bench 14. The driving of the motor 12 by the frequency converter 11 generates vibration in the motor installation. The vibration of is thereafter measured from the motor installation as vibration data by said one or more vibration sensors 21, 22. Whereas in the presented embodiment a motor is shown as an electric machine, in another embodiment of the present invention the motor could be replaced by a generator as electric machine.

Figure 3:
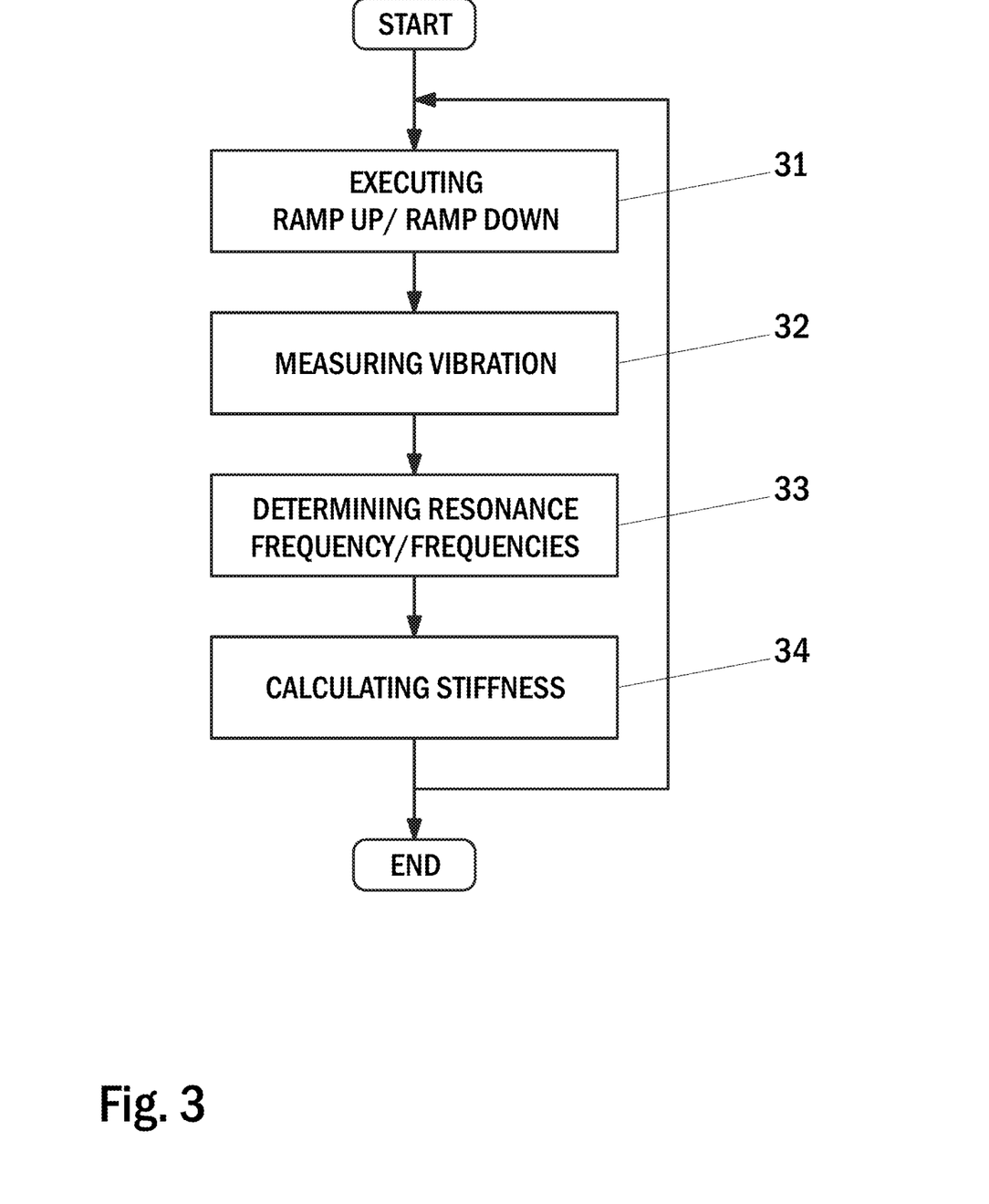
FIG. 3 illustrates a flow diagram of a method step of determining the resonance frequency/frequencies and the stiffness of an embodiment of a method according to the present invention.

FIG. 3 illustrates a flow diagram of a method step of determining the resonance frequency/frequencies and the stiffness of an embodiment of a method according to the present invention. In said method step of determining the resonance frequency/frequencies and the stiffness, first a ramp up/ramp down of an electric machine is executed 31. Said ramp up/ramp down is executed 31 with the help of a variable frequency drive, e.g. a frequency converter. During the executed ramp up/ramp down test, the electric machine is started up and run with a long ramp controlled by a variable frequency drive, e.g. a frequency converter, and the vibration data is measured 32 continually. In said ramp up/ramp down test, said ramp may be a speed ramp. Furthermore, said ramp may be a long speed ramp, up to a speed of 1.2 times the rated speed of the electric machine (i.e., 20% over the rated speed of the electric machine).

During the executed ramp up/ramp down test, vibration is measured 32 from the electric machine as vibration data by said one or more vibration sensors 21, 22. Said one or more vibration sensors 21, 22 may comprise accelerometers. The measured vibration data may comprise vibration velocity root mean square, acceleration, velocity and/or displacement.

Said measured vibration data is analysed in order to determine the resonance frequency/frequencies. The measured vibration data may be conditioned in the variable frequency drive, so it is supposed that special provision is in the variable frequency drive hardware for measured vibration data signal processing. In an alternative solution, a commercial vibration amplifier can be used to provide a voltage signal to the variable frequency drive.

As the next step, a resonance frequency/resonance frequencies is/are determined 33 utilizing said measured vibration data. After determining the resonance frequency/frequencies, the stiffness of the electric machine is calculated 34 utilizing said determined resonance frequency/frequencies.

In the method step of determining the resonance frequency/frequencies and the stiffness according to the present embodiment, the steps of executing a ramp up/ramp down 31, measuring vibration 32, determining resonance frequency/frequencies 33 and calculating the stiffness 34 are repeated several times in a continuous loop, as deemed necessary. Thereafter, the resonance frequency/frequencies and stiffness are determined 30.

Figure 4:
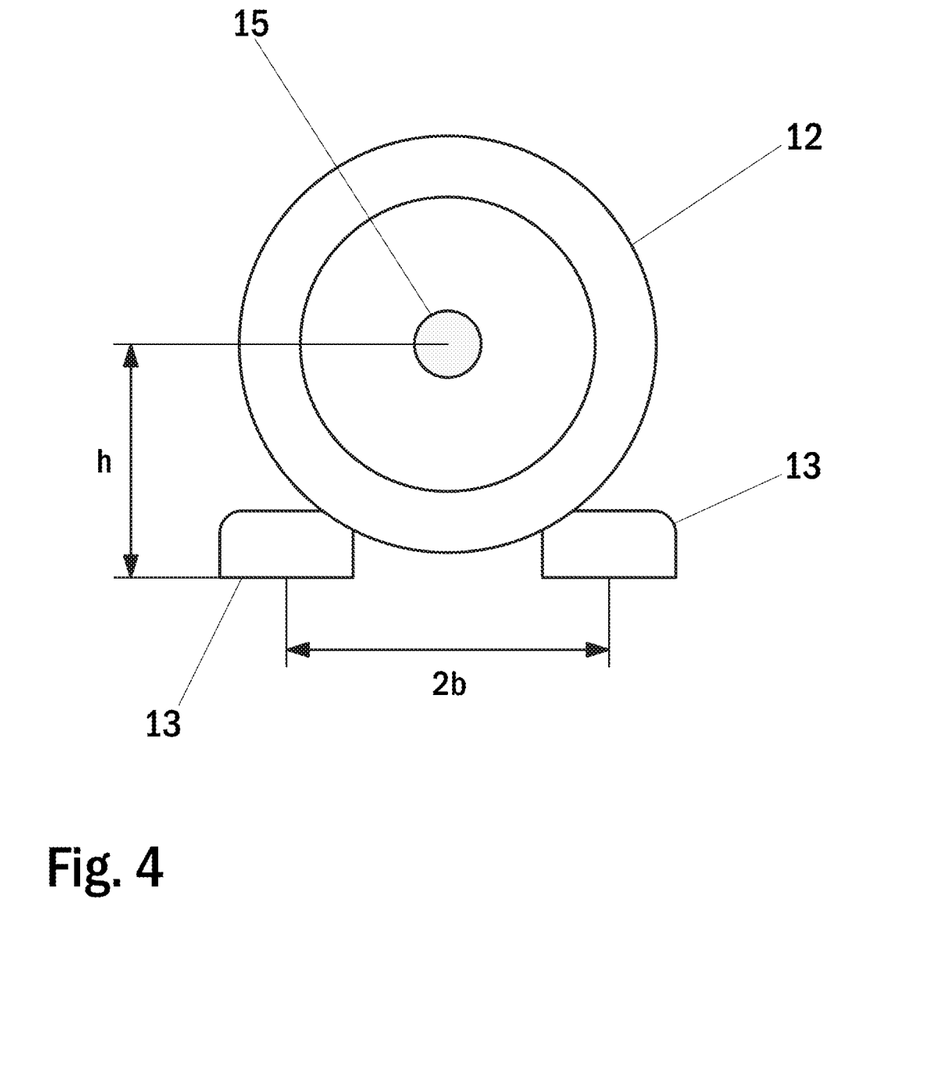
FIG. 4 illustrates an axial view of an embodiment of an electric machine of an arrangement according to the present invention.

FIG. 4 illustrates an axial view of an embodiment of an electric machine of an arrangement according to the present invention. In the presented embodiment, said electric machine is a motor 12, which motor comprises a motor shaft 15 and motor legs 13. In the presented arrangement, the distance between the motor legs is indicated as two times b, i.e. 2b. The height from the bottom of the motor legs to the middle of the motor shaft is indicated as h. The height h also indicates the height from the surface of a motor bench to the middle of the motor shaft of a motor installed on said motor bench. Whereas in the presented embodiment a motor is shown as an electric machine, in another embodiment of the present invention the motor could be replaced by a generator as electric machine.

Figure 5:
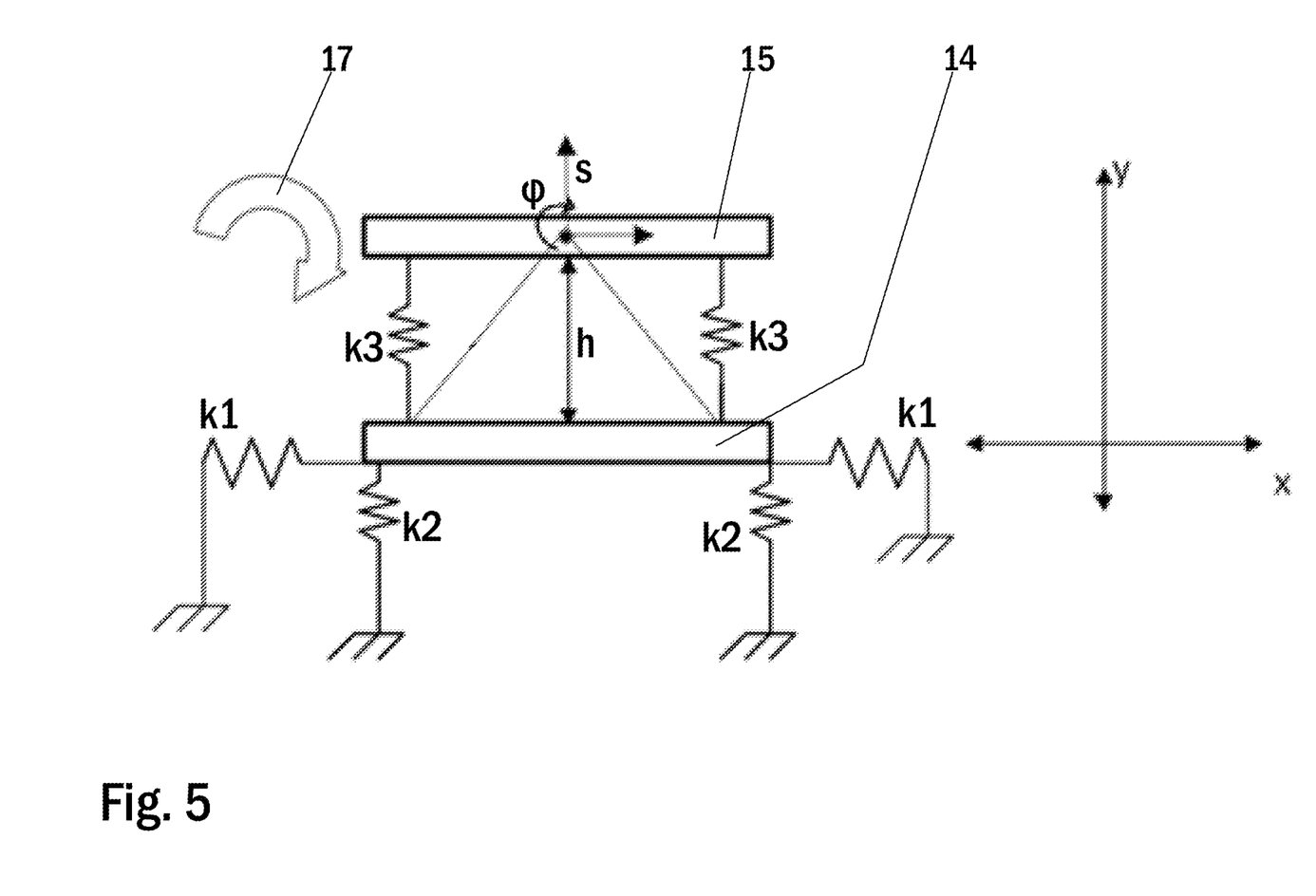
FIG. 5 illustrates a conceptual view of an embodiment of an electric machine of an arrangement according to the present invention.

FIG. 5 illustrates a conceptual view of an embodiment of an electric machine of an arrangement according to the present invention. In the presented conceptual view, a flexible bench is indicated with a reference number 14 and a shaft, i.e. a rotor, of an electric machine is indicated with a reference number 15 and total torque of the electric machine is indicated with a reference number 17. Said total torque 17 is in the direction of about the rotational axis. The height from the surface of a bench 14 to the middle of the rotor 15 is indicated as h. In the presented conceptual view, the coupling stiffness between the rotor to the feet of the electric machine is indicated as two times the feet stiffness $k_3$, i.e. $2k_3$. In the presented conceptual view, the stiffness of the bench of the electric machine is divided to elements of two times horizontal stiffness $k_1$ and two times vertical stiffness $k_2$.

In a ramp up/ramp down test the determination 30 of the resonance frequency/frequencies and the stiffness is done in a ramp up/ramp down test carried out with the help of a variable frequency drive, e.g. a frequency converter. The stiffness of the electric machine is calculated 34 utilizing the determined resonance frequency/frequencies. In said ramp up/ramp down test, the presented conceptual view can be used for determining the stiffness. In determining the stiffness, there is first taken some simplified mechanical model assumptions for a flexible bench:

- the bed vertical stiffness $k_2$ is much lower than the stator feet stiffness $k_3$,
- the rotor is assumed rigid, the elasticity of the rotor structure is neglected,
- the vibration displacements are small compared to dimensions of the electric machine,
- the basement stiffness is infinite, and
- damping factors are neglected.

According to Newton's second law from the equilibrium of forces, the centre of gravity of the machine structure is moving according to following equations [1] and [2]:

$$M \cdot a + K \cdot d = T, \text{ and} \quad [1]$$

$$\begin{bmatrix} m_{sr} & 0 & 0 \\ 0 & m_{sr} & 0 \\ 0 & 0 & I_{sr} \end{bmatrix} \cdot \begin{bmatrix} \ddot{x} \\ \ddot{y} \\ \ddot{\varphi} \end{bmatrix} + \begin{bmatrix} 2k_1 & 0 & -2k_2 \\ 0 & 2k_2 & 0 \\ -2k_1 h & 0 & 2(k_2 h^2 + k_2 b^2) \end{bmatrix} \cdot \begin{bmatrix} x \\ y \\ \varphi \end{bmatrix} = \begin{bmatrix} 0 \\ 0 \\ T + T_{control} \end{bmatrix}, \quad [2]$$

where:
$m_{sr}$ is the mass of the rotor plus stator, and
$I_{sr}$ is the machine moment of inertia in the direction of rotation.

Considering just the horizontal mode, the vibration resonance frequency is calculated as:

$$\omega_{1,2} = \sqrt{\frac{-B \pm \sqrt{B^2 - 4AC}}{2A}}, \quad [3]$$

where:

$$A = m_{sr} I_{sr}, \quad [4]$$

$$B = 2 \cdot [m_{sr} k_1 b^2 + m_{sr} k_2 h^2 + k_1 I_{sr}], \text{ and} \quad [5]$$

$$C = 4 k_1 k_2 b^2. \quad [6]$$

Stator and rotor masses are usually known as well as the moment of inertia, so from the natural frequencies it is possible by solving the system of equation find the unknown horizontal stiffness $k_1$ and vertical stiffness $k_2$. When the bench is very soft, the stator feet stiffness $k_3$ can be considered to be large as in a rigid connection. The stiffness of the electric machine is calculated from the now solved elements of two times horizontal stiffness $k_1$ and two times vertical stiffness $k_2$.

Figure 6:
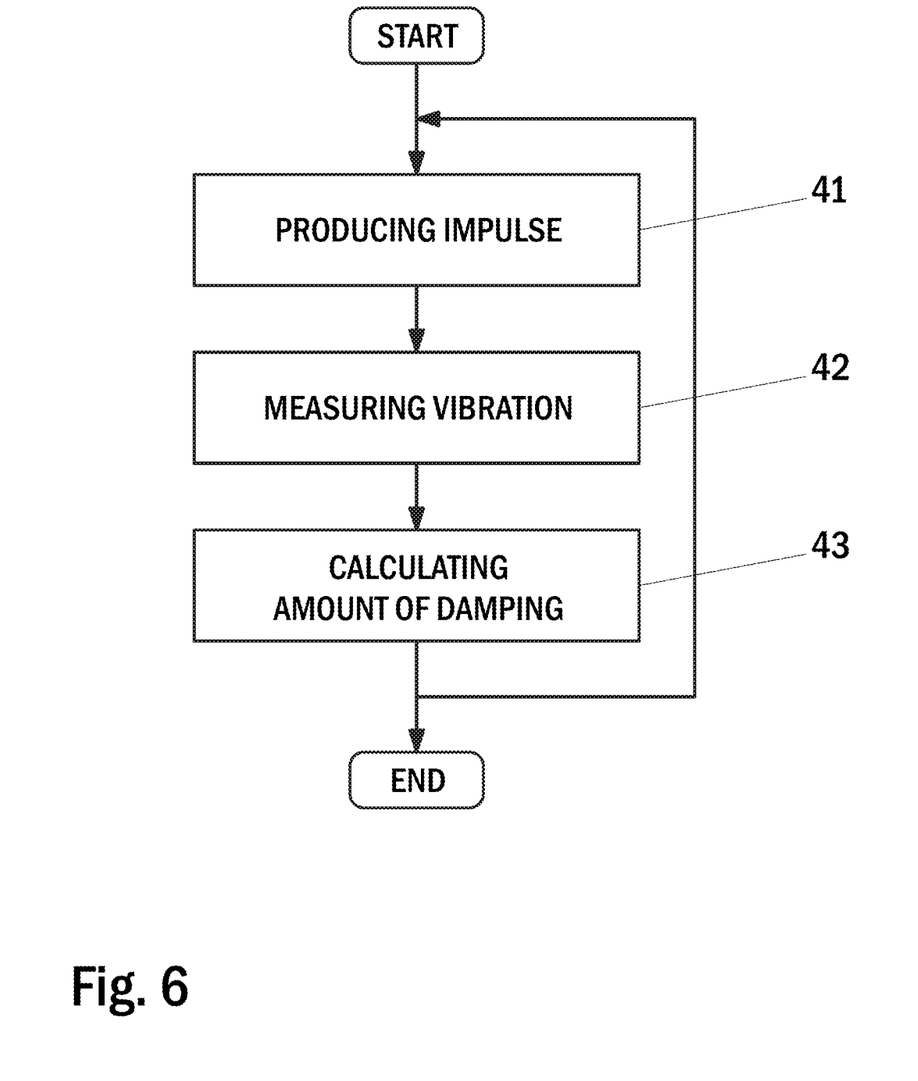
FIG. 6 illustrates a flow diagram of a method step of determining the amount of damping of an embodiment of a method according to the present invention.

FIG. 6 illustrates a flow diagram of a method step of determining the amount of damping of an embodiment of a method according to the present invention. In said method step of determining the amount of damping, first an impulse is produced 41 in an impulse test.

Said impulse test is executed with the help of a variable frequency drive, e.g. a frequency converter. During the executed impulse test, the electric machine is run by a given maximum voltage signal for a short time controlled by a variable frequency drive, e.g. a frequency converter, and vibration is measured 42 continually as measured vibration data. Said a short time controlled by a variable frequency drive may e.g., be only fractions of seconds.

During the executed impulse test, vibration is measured 42 from the electric machine as vibration data by said one or more vibration sensors 21, 22. Said one or more vibration sensors 21, 22 may comprise accelerometers. The measured vibration data may comprise vibration velocity root mean square, acceleration, velocity and/or displacement.

As the next step, the amount of damping is calculated 43 utilizing said measured vibration data. In the executed impulse test, said maximum voltage signal will produce a shock in the mechanical system, the system will vibrate, and the oscillations will damp out by themselves. This type of test will allow the variable frequency drive to calculate the amount of damping in the mechanical system.

Said measured vibration data is analysed in order to determine the amount of damping. The measured vibration data may be conditioned in the variable frequency drive, so it is supposed that special provision is in the variable frequency drive hardware for measured vibration data signal processing. In an alternative solution, a commercial vibration amplifier can be used to provide a voltage signal to the variable frequency drive.

In the method step of determining the amount of damping according to the present embodiment, the steps of producing an impulse 41, measuring vibration 42 and calculating the amount of damping 43 may be repeated several times in a continuous loop, as deemed necessary. Thereafter, the amount of damping is determined 40.

Figure 7:
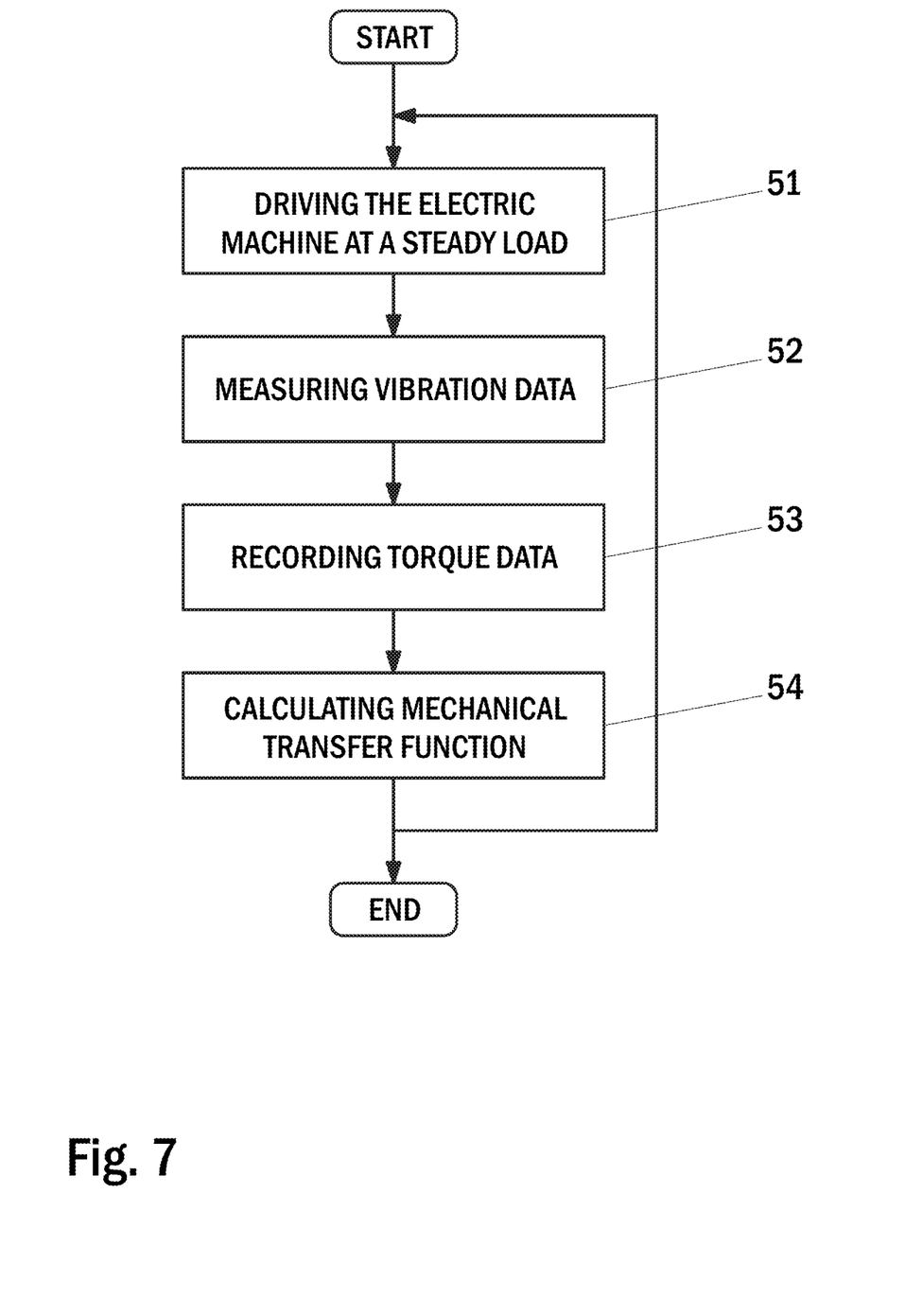
FIG. 7 illustrates a flow diagram of a method step of determining the mechanical transfer function of an embodiment of a method according to the present invention.

FIG. 7 illustrates a flow diagram of a method step of determining the mechanical transfer function of an embodiment of a method according to the present invention. In said method step of determining the mechanical transfer function, first an electric machine is driven at a steady load 51 in a steady state test.

Said steady state test is executed 51 with the help of a variable frequency drive, e.g. a frequency converter. During the executed steady state test, the electric machine is run at a certain load condition for a certain period controlled by a variable frequency drive, e.g. a frequency converter, and vibration is measured 52 continually as measured vibration data.

During the executed steady state test, vibration is measured 52 from the electric machine as vibration data by said one or more vibration sensors 21, 22. Said one or more vibration sensors 21, 22 may comprise accelerometers. The measured vibration data may comprise vibration velocity root mean square, acceleration, velocity and/or displacement.

During the executed steady state test, torque data of the electric machine is recorded 53 from the electric machine as recorded torque data by a variable frequency drive, e.g. a frequency converter.

As the next step, a mechanical transfer function is calculated 54 utilizing said measured vibration data and/or said recorded torque data. In the executed steady state test, the coupling stiffness between the electric machine stator to the electric machine feet may also be determined utilizing said measured vibration data and/or said recorded torque data.

In the executed steady state test, said mechanical transfer function $H_{(S)}$ is calculated in the frequency domain as:

$$H_{(S)} = \frac{A_{(s)}}{T_{(s)}}, \text{ where} \quad [7]$$

$A_{(S)}$ is the discrete FFT of the acceleration in said measured vibration data, and
$T_{(S)}$ is the discrete FFT of the electromagnetic force in said said recorded torque data.

In the method step of determining the mechanical transfer function according to the present embodiment, the steps of driving the electric machine at a steady load 51, measuring vibration 52, recording torque data 53 and calculating the mechanical transfer function 54 may be repeated several times in a continuous loop, as deemed necessary. Thereafter, the mechanical transfer function is determined 50.

In the method according to the present invention, the analysis of a mechanical model and mechanical transfer function may be carried out as described in a conference paper: "Jover Rodriguez, P., Negrea, M., Arkkio, A., 2004, *Mechanical Model to Study Induction Motor under Fault Conditions, Proceedings of the 16th International Conference on Electrical Machines (ICEM 2004), Cracow, Poland, September 2004, Conference Proceeding CD, Paper No. 100.*", chapter V. Hybrid model.

Figure 8:
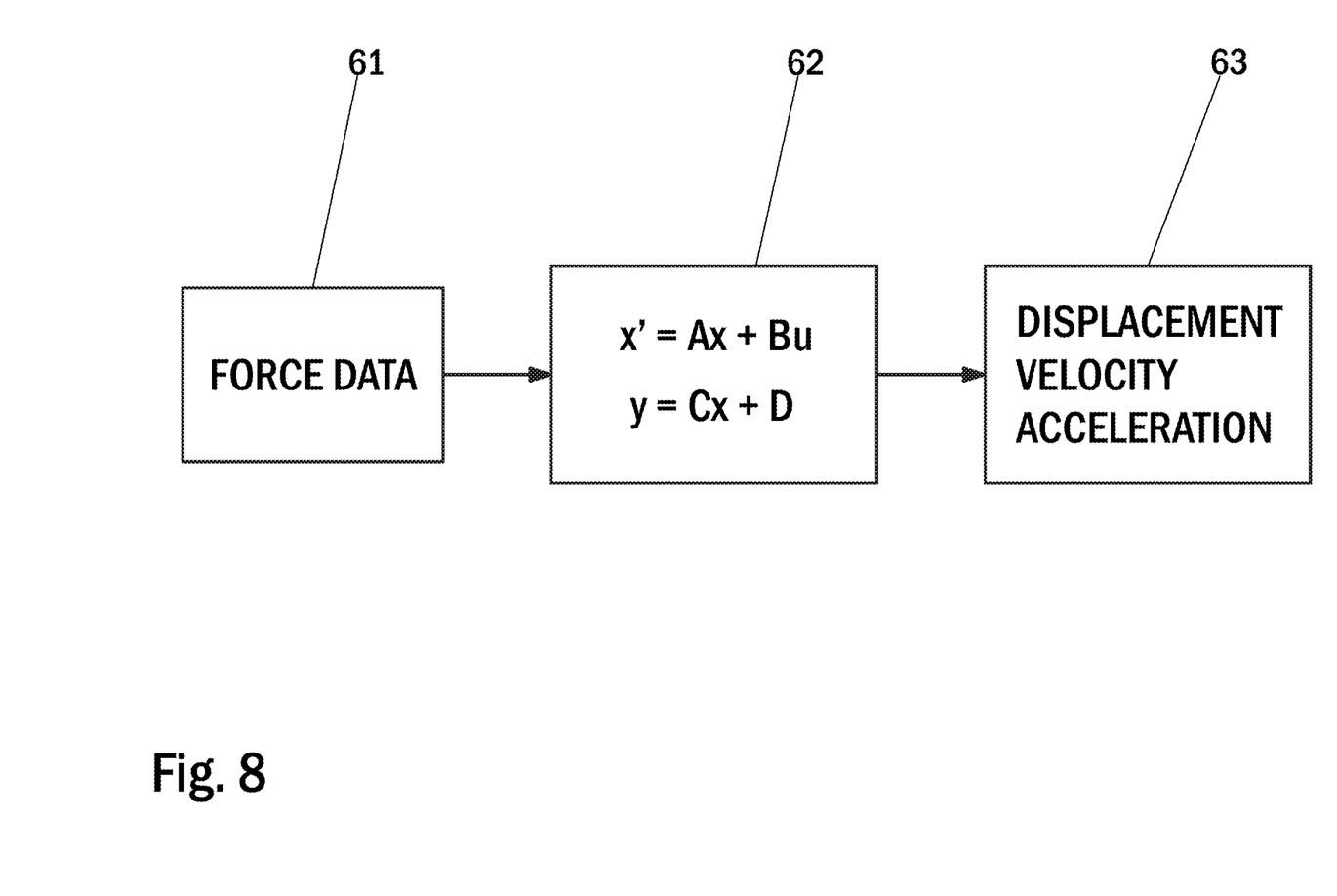
FIG. 8 illustrates a state space model for determining the vibration control model of an embodiment of a method according to the present invention.

FIG. 8 illustrates a state space model for determining the vibration control model of an embodiment of a method according to the present invention. In the method step of determining the vibration control model, the equation [2] is utilized in building a state space model for calculating the actual displacement under different conditions.

In the method step of determining the vibration control model according to the present embodiment, there is built a state space model of the physical system as a set of input variables, a set of output variables and a set of state variables related by equations. In the present embodiment, the built state space model comprises force data as the set of input variables 61, displacement data, velocity data and acceleration data as the set of output variables 63, and a set of state variables related by equations: x'=Ax+Bu and y=Cx+D, here reference numbered as 62. Thereafter, a vibration control model is determined 60 utilizing the built state space model. In the method according to the present embodiment, an electric machine is driven by a variable frequency drive, The variable frequency drive measures and/or records speed data and torque data of the electric machine. After the vibration control model has been determined 60, vibration is controlled 70 utilizing said vibration control model.

In the method according to the present invention, the analysis of a state space model and data analysis may be carried out as described in a conference paper: "Jover Rodriguez, P., Negrea, M., Arkkio, A., 2004, *Mechanical Model to Study Induction Motor under Fault Conditions, Proceedings of the 16th International Conference on Electrical Machines (ICEM 2004), Cracow, Poland, September 2004, Conference Proceeding CD, Paper No. 100.*", chapter III. Analysis with simulation data.

Figure 9:
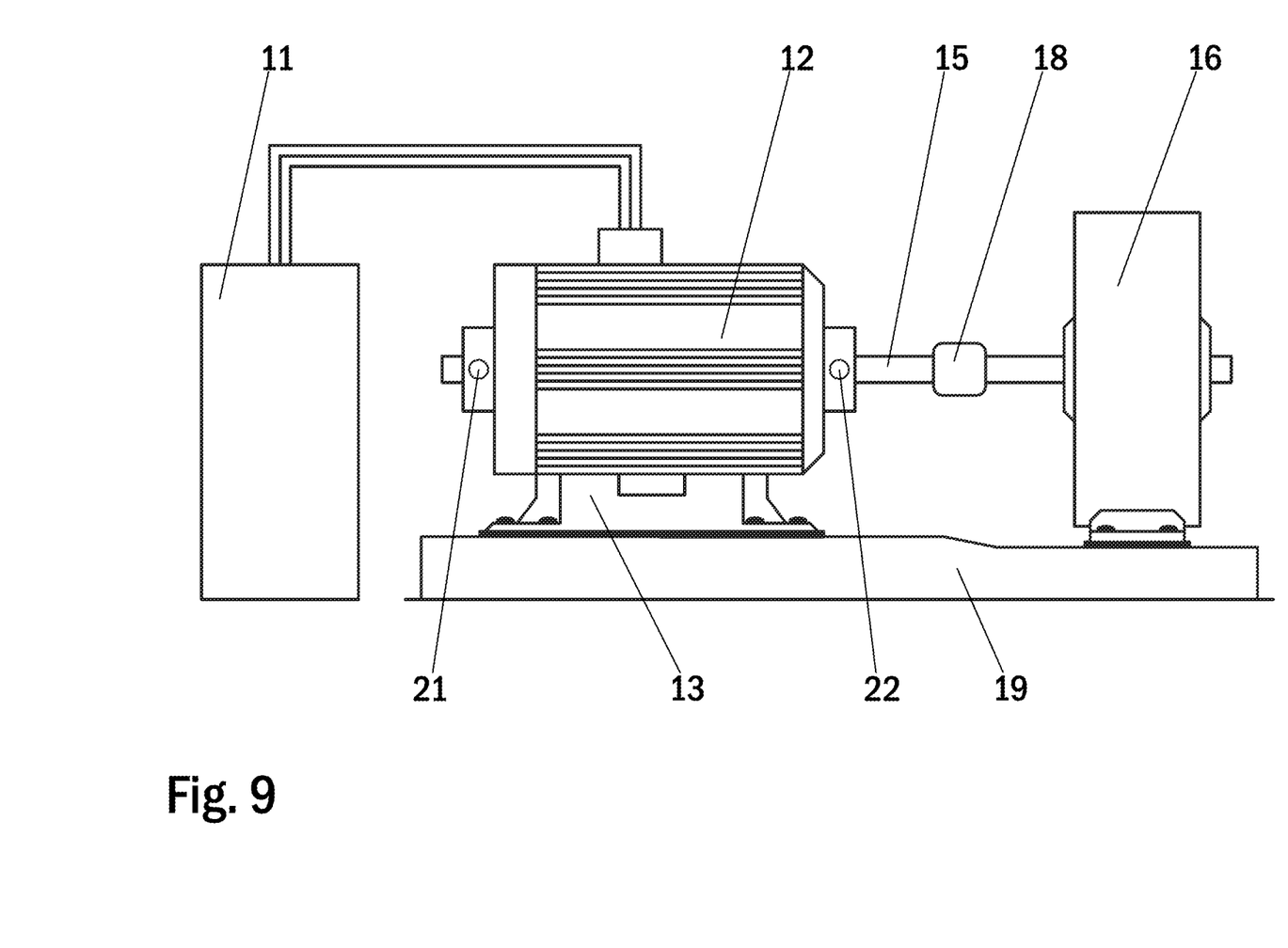
FIG. 9 illustrates a diagram of another embodiment of an arrangement according to the present invention.

FIG. 9 illustrates a diagram of another embodiment of an arrangement according to the present invention. The presented another embodiment of an arrangement comprises a frequency converter 11, electric machine and a load 16. In the presented embodiment, said electric machine is a motor 12 installed on a non-flexible motor foundation 19. Said motor 12 comprises a motor shaft 15 and motor legs 13 installed on said non-flexible motor foundation 19. The load 16 is coupled to the motor shaft 15 via a coupling arrangement 18.

In the presented another embodiment, said arrangement comprises one or more vibration sensors 21, 22. Said one or more vibration sensors 21, 22 may comprise sensors 21, 22 installed on the motor 12, for example close to the ends of the motor 12, i.e. close to the motor bearings, e.g. in the bearing housing, in the end-shield or in the stator frame depending upon the investigated vibration mode. Whereas in the presented embodiment a motor is shown as an electric machine, in another embodiment of the present invention the motor could be replaced by a generator as electric machine.

With the help of the present invention vibration can be controlled by a variable frequency drive and the level of harmful electric machine vibrations can be substantially reduced.

With the help of the present invention the mechanical properties of the mechanical system such as natural frequencies, stiffness of different parts and damping factors can be identified and included in a mechanical model that allows the control of vibrations excited from different sources such as unbalance, eccentricities, electromagnetic and mechanics problems.

With the help of the method and an arrangement for determining vibration characteristics of an electric machine according to the present invention the determination of the vibration characteristics of an electric machine is easier and more efficient, especially in operational condition.

Furthermore, the method and an arrangement for determining vibration characteristics of an electric machine according to the present invention provides easy and efficient of determining of the vibration characteristics of said electric machine which is also useful in determining the condition of said an electric machine.

It is to be understood that the above description and the accompanying figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims and their equivalents.

The invention claimed is:

1. A method for controlling vibration of a variable frequency drive controlled electric machine, in which method:
   a resonance frequency/frequencies and a stiffness of the electric machine are determined in a ramp up/ramp down test, said ramp up/ramp down test is executed with help of a variable frequency drive;
   an amount of damping is determined in an impulse test;
   a mechanical transfer function is determined in a steady drive state test;
   a vibration control model is determined utilizing said resonance frequency/frequencies, said stiffness, said amount of damping, and said mechanical transfer function; and
   vibration of the electric machine is controlled utilizing said vibration control model;
   wherein in the step of determining the resonance frequency/frequencies and the stiffness:
   the ramp up/ramp down test of the electric machine is executed;
   vibration is measured continually during said executed ramp up/ramp down as a first measured vibration data;
   the resonance frequency/frequencies is/are determined utilizing said first measured vibration data; and
   the stiffness is calculated utilizing said determined resonance frequency/frequencies;
   wherein in the step of determining the amount of damping:
   an impulse is produced in the impulse test;
   vibration is measured continually during said impulse test as a second measured vibration data; and
   the amount of damping is calculated utilizing said second measured vibration data.

2. The method according to claim 1, wherein in said impulse test, the electric machine is run by a given maximum voltage signal for a short time controlled by said variable frequency drive.

3. The method according to claim 2, wherein in the step of determining the mechanical transfer function:
   the electric machine is driven at a steady load in said steady state test;
   vibration is measured continually during said steady state test to thereby obtain measured vibration data;
   torque of the electric machine is recorded continually during said steady state test as recorded torque data; and
   a mechanical transfer function $H_{(s)}$ is calculated utilizing said measured vibration data and/or said recorded torque data.

4. The method according to claim 2, wherein in the step of determining the vibration control model, a state space model of the physical system is built as a set of input variables, a set of output variables and a set of state variables related by equations.

5. The method according to claim 1, wherein in the step of determining the mechanical transfer function:
   the electric machine is driven at a steady load in a said steady state test;
   vibration is measured continually during said steady state test to thereby obtain measured vibration data;
   torque of the electric machine is recorded continually during said steady state test as recorded torque data; and
   a mechanical transfer function H(s) is calculated utilizing said measured vibration data and/or said recorded torque data.

6. The method according to claim 5, wherein in said steady state test, the electric machine is run at a certain load condition for a certain period controlled by said variable frequency drive.

7. The method according to claim 6, wherein in said steady state test, said mechanical transfer function $H_{(s)}$ is calculated in the frequency domain as:

$$H_{(S)} = \frac{A_{(s)}}{T_{(s)}},$$

where
$A_{(S)}$ is the discrete FFT of the acceleration in said measured vibration data, and
$T_{(s)}$ is the discrete FFT of the electromagnetic force in said said recorded torque data.

8. The method according to claim 5, wherein in said steady state test, said mechanical transfer function $H_{(s)}$ is calculated in the frequency domain as:

$$H_{(S)} = \frac{A_{(s)}}{T_{(s)}},$$

where
$A_{(S)}$ is the discrete FFT of the acceleration in said measured vibration data, and
$T_{(s)}$ is the discrete FFT of the electromagnetic force in said said recorded torque data.

9. The method according to claim 1, wherein in the step of determining the vibration control model, a state space model of the physical system is built as a set of input variables, a set of output variables and a set of state variables related by equations.

10. An arrangement for controlling vibration of a variable frequency drive controlled electric machine, said arrangement comprising a frequency converter, an electric machine and one or more vibration sensors, wherein said frequency converter is:

arranged for executing a ramp up/ramp down of the electric machine in a ramp up/ramp down test and determining a resonance frequency/frequencies and a stiffness;

arranged for running the electric machine by a given maximum voltage signal for a short time in an impulse test and determining an amount of damping;

arranged for running the electric machine at a certain load condition for a certain period in a steady state test and determining a mechanical transfer function;

arranged for determining a vibration control model utilizing said resonance frequency/frequencies, said stiffness, said amount of damping and said mechanical transfer function; and arranged for controlling vibration of the electric machine utilizing said vibration control model;

wherein in determining the resonance frequency/frequencies and the stiffness:

vibration is measured continually during said executed ramp up/ramp down test as first measured vibration data;

the resonance frequency/frequencies is/are determined utilizing said first measured vibration data; and the stiffness is calculated utilizing said determined resonance frequency/frequencies.

11. The arrangement according to claim 10, wherein said electric machine is installed on a flexible bench.

12. The arrangement according to claim 10, wherein said electric machine is installed on a non-flexible foundation.

13. The arrangement according to claim 10 wherein said one or more vibration sensors include sensors, such as accelerometers, installed on the electric machine.

14. The arrangement according to claim 13, wherein said sensors are installed close to the ends of the electric machine.

15. A frequency converter of an arrangement for controlling vibration of a variable frequency drive controlled electric machine, said arrangement comprising the electric machine and one or more vibration sensors, wherein said frequency converter is:

arranged for executing a ramp up/ramp down of the electric machine in a ramp up/ramp down test and determining a resonance frequency/frequencies and a stiffness;

arranged for running the electric machine by a given maximum voltage signal for a short time in an impulse test and determining an amount of damping;

arranged for running the electric machine at a certain load condition for a certain period in a steady state test and determining a mechanical transfer function;

arranged for determining a vibration control model utilizing said resonance frequency/frequencies, said stiffness, said amount of damping and said mechanical transfer function; and arranged for controlling vibration of the electric machine utilizing said vibration control model;

wherein in determining the resonance frequency/frequencies and the stiffness:

vibration is measured continually during said executed ramp up/ramp down test as first measured vibration data;

the resonance frequency/frequencies is/are determined utilizing said first measured vibration data; and the stiffness is calculated utilizing said determined resonance frequency/frequencies.

* * * * *